US008593938B2

(12) United States Patent
Russell (10) Patent No.: US 8,593,938 B2
(45) Date of Patent: Nov. 26, 2013

(54) ULTRA-WIDEBAND RADIO RECEPTION USING VARIABLE SAMPLING RATES OVER A SPREADING SEQUENCE CYCLE

(75) Inventor: Mark Russell, Reading (GB)

(73) Assignee: Thales Holdings UK PLC, Surrey (GB)

( * ) Notice: Subject to any disclaimer, the term of this patent is extended or adjusted under 35 U.S.C. 154(b) by 387 days.

(21) Appl. No.: 12/940,335

(22) Filed: Nov. 5, 2010

(65) Prior Publication Data

US 2011/0105148 A1    May 5, 2011

(30) Foreign Application Priority Data

Nov. 5, 2009  (GB) .................................. 0919440.8

(51) Int. Cl.
*H04J 11/00* (2006.01)

(52) U.S. Cl.
USPC ............................ 370/210; 370/278; 375/136

(58) Field of Classification Search
USPC .................................. 370/210, 278; 375/136
See application file for complete search history.

(56) References Cited

U.S. PATENT DOCUMENTS

| | | | | |
|---|---|---|---|---|
| 5,222,098 A * | 6/1993 | Yamamoto et al. | ........... | 375/131 |
| 6,657,986 B1 | 12/2003 | Laudel et al. | | |
| 6,778,135 B2 * | 8/2004 | Warloe et al. | ........... | 342/357.63 |
| 6,940,827 B2 * | 9/2005 | Li et al. | ........... | 370/278 |
| 7,012,884 B2 * | 3/2006 | Horne | ........... | 370/208 |
| 8,068,584 B2 * | 11/2011 | Wu et al. | ........... | 379/1.04 |
| 8,193,980 B2 * | 6/2012 | Nayyar | ........... | 342/357.48 |
| 2005/0285781 A1 * | 12/2005 | Park et al. | ........... | 342/357.02 |
| 2006/0170589 A1 * | 8/2006 | Park et al. | ........... | 342/357.02 |
| 2011/0181464 A1 * | 7/2011 | Vasilyev et al. | ........... | 342/357.27 |

FOREIGN PATENT DOCUMENTS

| | | |
|---|---|---|
| EP | 1 292 043 | 3/2003 |
| EP | 0 984 559 A3 | 2/2004 |
| WO | WO 99/60718 | 11/1999 |
| WO | WO 2007/086858 | 8/2007 |

OTHER PUBLICATIONS

Great Britain Search Report dated Feb. 12, 2010 in GB0919440.8 Patent Application.
Anthony Lo et al "Europcom-An Ultra-WideBand (UWB)-Based Ad Hoc Network for Emergency Applications", VTC Spring 2008, IEEE, Piscataway, NJ pp. 6-10.
Y Suzuki et al "Direct-sequence/spread-spectrum communication system with sampling rate selection diversity," IEICE Trans. Commun. Jan. 2008, Tokyo, JP, pp. 267-273.

* cited by examiner

*Primary Examiner* — Hassan Kizou
*Assistant Examiner* — Abdullahi Ahmed
(74) *Attorney, Agent, or Firm* — Stroock & Stroock & Lavan LLP (57) ABSTRACT

A radio receiver accumulates, over all hops of a frequency hopping cycle, digital samples of a carrier signal correlated with a spreading sequence, and performs a Fourier transformation of the accumulated digital samples to generate output data representative of data conveyed by the carrier signal and/or the time of receipt of the carrier signal. The receiver includes a processor arranged to synchronize itself with the frequency hopping cycle and with the spreading sequence at each predetermined value of frequency, by repeating the correlation at different phases of the hopping sequence and of the spreading sequence so as to maximize the output data The correlation and accumulation are performed at a higher sampling rate over a high-resolution portion of one spreading sequence cycle than over the remainder of that spreading sequence cycle.

17 Claims, 11 Drawing Sheets

ULTRA-WIDEBAND RADIO RECEPTION USING VARIABLE SAMPLING RATES OVER A SPREADING SEQUENCE CYCLE

This application claims priority to UK Patent Application No. 0919440.8, filed Nov. 5, 2009, the entire content of which is expressly incorporated herein by reference.

This invention relates to the reception of frequency hopped ultra-wideband radio signals, of the type disclosed in our UK Patent No. GB23133709B. Such signals are useful in positioning systems that use synchronised signals from a number of reference stations, as the ultra-wideband of frequency transmission makes the system tolerant to multi path signals due to reflections from objects; and to interference from other radio signals. An RF, radio frequency, carrier wave is modulated digitally with a direct-sequence spread spectrum, DSSS, to generate a short transmission at an effective bandwidth of the order of 20 MHz. The centre frequency of this transmission is then changed to a different frequency in what is known as a frequency hop, and the centre frequency is then changed in a predetermined sequence of further hops, so that over an entire frequency hopping cycle the effective frequency bandwidth is much larger and typically of the order of 1 GHz or greater.

The direct sequence spread spectrum may be modulated with digital data at a much lower data rate such as 1 kbps to 15 kbps. When the modulated signal is demodulated in a receiver which contains the direct sequence, using a correlation process, the original data are retrieved. Once a receiver is synchronised with an incoming signal, so that it is correctly analysing the binary sequence in phase, the receiver is able to identify the leading edge of the impulse response of the channel between the transmitter and receiver, and this in turn allows it to determine the duration of transmission of that signal from a transmitter. Accordingly, even without a significant amount of binary data being modulated into the DSSS signal, the transmission can be used in position finding, for example by using triangulation techniques on the signals between multiple transceivers. The systems are however also useful for the communication of low speed data such as voice data, in the range of 1 kbps to 15 kbps.

In order to maximise the signal to noise ratio in signal reception, it is desirable to integrate the demodulation results from the signal received at each frequency hop of one cycle of frequency hopping. The receiver will generally have to perform parallel correlation or matched filtering followed by Fourier transformation at the end of a cycle of 125 hops. This has the problem of requiring a large amount of embedded digital memory, and there is a necessary trade off between memory size and acquisition time, i.e. the time taken for the receiver to synchronise itself with the phase of the incoming signal. Mobile receivers or transceivers may for example have memory-limited devices such as field programmable gate arrays, FPGA.

The purpose of the present invention is to reduce the amount of memory taken by the receiver apparatus as random access memory, whilst maintaining a satisfactory performance of the demodulator in the receiver.

Accordingly, the invention provides a radio receiver arranged to sample an input signal comprising a carrier signal modulated by a predetermined spreading sequence of pseudo-noise code symbols or chips that is stored in the receiver, the carrier signal frequency hopping between predetermined values in a predetermined sequence which is repeated cyclically and is stored in the receiver; the receiver being arranged to accumulate, over all the hops of the frequency hopping cycle, digital samples of the input signal correlated with the spreading sequence, and to perform a Fourier transformation of the accumulated digital samples to generate output data representative of data conveyed by the input signal and/or the time of receipt of the input signal; the receiver comprising a processor arranged to synchronise itself with the frequency hopping cycle and with the spreading sequence at each predetermined value of frequency, by repeating the correlation at different phases of the hopping sequence and of the spreading sequence such as to maximise the output data; wherein the correlation and accumulation are performed at a higher sampling rate over a high-resolution portion of one spreading sequence cycle than over the remainder of that spreading sequence cycle.

Preferably, the sampling rate over the high-resolution portion is an integer multiple of the chip rate of the spreading sequence.

Preferably, the integer multiple is four.

Preferably, the sampling rate outside the high-resolution portion is equal to the chip rate.

Preferably, the receiver comprises multiple parallel correlators coupled to respective taps of a shift register which stores the spreading sequence.

Alternatively, the receiver comprises a matched data filter having shift registers for storing the samples and multipliers for multiplying the shift register outputs with the spreading sequence, and an accumulator for storing the multiplication results for a cycle of the spreading sequence.

Preferably, the frequency hopping cycle is such that the frequency increases step-wise in a ramp in one cycle.

Preferably, the receiver comprises a signal processor arranged to first synchronise the receiver with the input signal such that the accumulator stores the data from the demodulation of the input signal, and then to provide an output indicative of the timing of the leading edge of the impulse response of the channel on which the receiver receives the input signal, for use in position finding by determining the duration of transmission of the signal.

Preferably, the receiver comprises a signal processor arranged to first synchronise the receiver with the input signal such that the accumulator stores the data from the demodulation of the input signal, and then to provide an output signal representative of the data conveyed by the input signal.

For example, the data are low data rate communications data such as voice data.

The invention may comprise a transceiver including the receiver, the transmitter and receiver sharing the same spreading sequence and frequency hopping cycle.

The invention may comprise a positioning system comprising a transmitter of DSSS signals and a receiver, the system arranged to determine the separation of the transmitter from the receiver as a function of the difference between the times of transmission and reception of a DSSS signal.

The invention also provides a method of receiving an input signal comprising a carrier signal modulated by a predetermined spreading sequence of pseudo-noise code symbols or chips, the carrier signal frequency hopping between predetermined values in a predetermined sequence which is repeated cyclically; comprising accumulating, over all the hops of the frequency hopping cycle, digital samples of the input signal correlated with the spreading sequence, performing a Fourier transformation of the accumulated digital samples to generate output data representative of data conveyed by the input signal; and establishing the timing of the frequency hopping sequence and of the spreading sequence at each hop in order to obtain synchronisation, by maximising the output data from the Fourier transformation; wherein the correlation and accumulation is performed at a higher sampling rate over a high-resolution portion of one spreading sequence cycle than over the remainder of that spreading sequence cycle.

By providing a high-resolution portion, or "focus" region, in the sequence of correlation and accumulation processes, valuable random access memory can be saved, whilst still providing sufficient resolution in the data for a useful output once the signal has been fully acquired, i.e once synchronisation has been achieved with the incoming signal.

By way of example, in order to provide accurate timing information and high receiver sensitivity, the correlator in a frequency hopped ultra-wideband system needs to decorrelate the signal at least a quarter chip resolution, i.e. with four samples per chip or symbol. One such system uses a repeated forty bit DSSS sequence, which means that sampling at quarter chip intervals leads to 160 complex correlator outputs per frequency hop. In this system, there are 125 hops in a frequency hopping cycle, and a full cycle must be accumulated in memory before the correlator outputs can be used, which means that 20,000 complex correlator results need to be stored and then processed by a fast Fourier transform unit, FFT, at the end of a cycle. As a new frequency hopping cycle will have started by the time the FFT can be run, double buffers are needed, so that 40,000 memory addresses are required just for the correlator. If in this example the I and Q correlator outputs (assuming quadrature phase shift keying, QPSK) use sixteen bit word widths, it is then necessary to use 160 kB of embedded memory.

However, we have recognised that the full resolution of quarter chip correlator resolution is really only necessary around the actual leading edge of the received signal, once the received signal has been acquired i.e. synchronised; and we have realised that all forty chip correlator results are required to enable initial acquisition, but that this acquisition can be performed sufficiently well at a reduced resolution, such as one sample per chip, to provide an indication of the signal timing. Memory can therefore be saved by storing quarter chip correlator outputs only over the "focus" region of timing, but by storing correlator results at single chip resolution outside this region.

Figure 3:
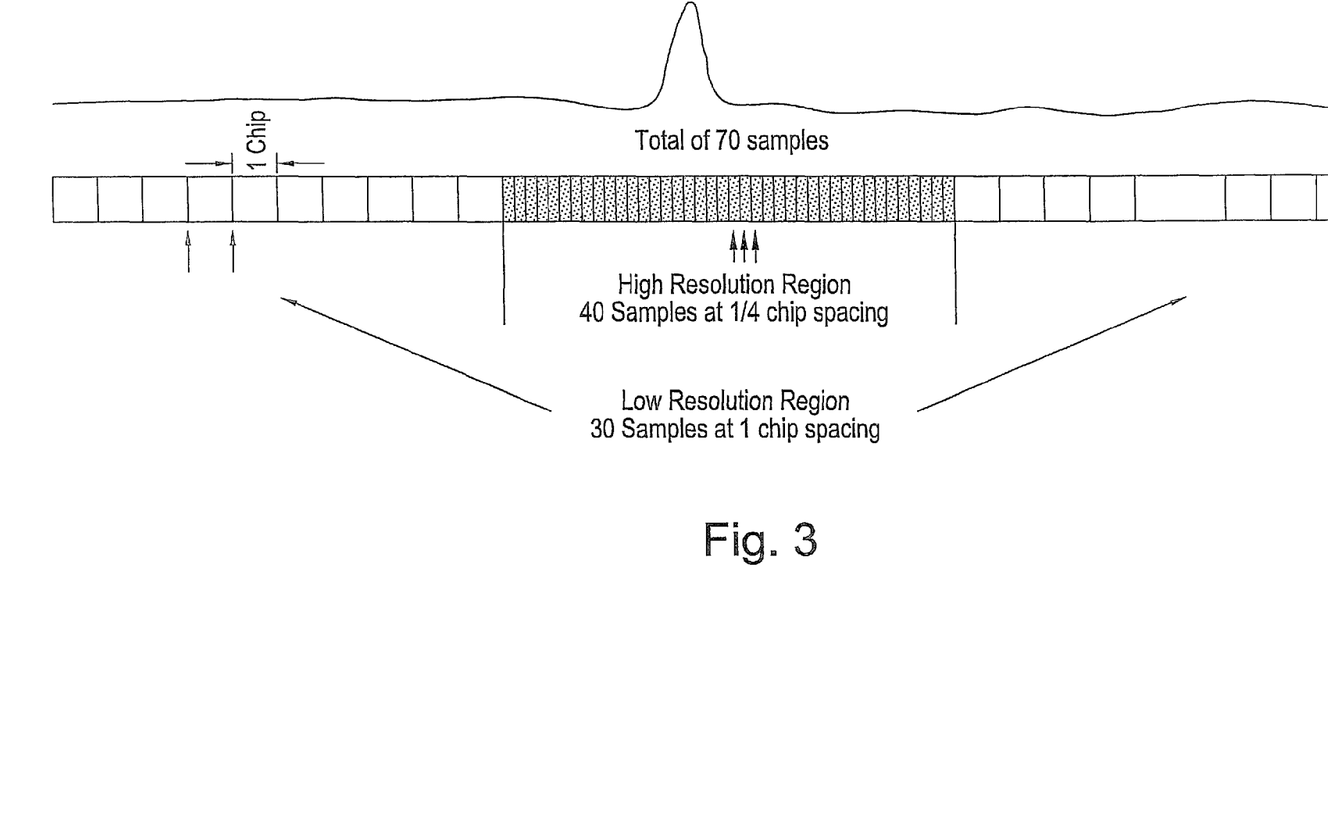
FIG. 3 represents an IQ accumulator sampling scheme with a high resolution central region.

The size of the focus region can be chosen to suit the particular implementation, and to provide the best trade off between memory usage and the expected dynamic behaviour of nodes in the system, recognising that fast moving nodes will require a larger focus region. In one example, a total of 70 samples are taken for each direct sequence, 40 samples being taken at one quarter chip spacing in the high-resolution region, and 30 samples being taken at single chip spacing in the low resolution region (as illustrated in FIG. 3 of the drawings).

As explained in GB2383709B referred to above, the frequency hopped ultra-wideband spread spectrum signal of the present invention has characteristics that are well matched to the application of precise positioning in environments where GPS, global positioning system, is unreliable. At the same time, it is useful for the transmission of communications at relatively low data rates, such as voice communications. The sensitivity of the system allows it to operate at low power, so as to avoid interference with other radio communications systems, and to allow it to be licensed for commercial use. The system is intended for short and medium range applications, such as in buildings and up to a few hundred metres in range (1 km is the 'free space' range typically achieved).

It will be appreciated that the carrier wave can be modulated digitally using any recognised technique including phase shift keying, PSK. Any number of phases may be used in the PSK, and options include binary phase shift keying, BPSK, and quadrature phase shift keying, QPSK. Multiple access systems can also be devised by using unique spreading wave forms, one example being code division multiple access, CDMA.

Data may be carried as Pilot Assisted Binary Phase Shift Keying (PA-BPSK), sent on 124 frequency hopper carriers, with a $125^{th}$ one unused. Data rates of up to 100 kb/s per channel are possible, with 25 orthogonal channels available. However, a unit can then only receive or transmit on one channel at once.

Ranging may be performed with all zeros BPSK data, making up one or more pilot cycles of 125 frequency hops. A Fourier transform on the received carriers provides an impulse response from which the delay of the channel is obtained as explained above.

The frequency hopping cycle may be devised to suit the particular application required. One example of the sequence is a ramp in which the centre frequency increases in equal steps at equal intervals. If there are 125 hops, and the DSSS signal has a bandwidth of 20 MHz, with each hop overlapping by 10 MHz with the previous hop, then the frequency width of each frequency hopping cycle is 125×10 MHz or 1.25 GHz, with each hop having a duration of 8 μs so as to give a cycle a duration of 1 ms.

The frequency hopping and the accumulation of data from all the hops allows the system to receive more power relative to the noise, and so gives an improved range of operation.

In order that the invention may be better understood, two preferred embodiments will now be described, by way of example only, with reference to the accompanying diagrammatic drawings, in which.

A communications system embodying the invention typically comprises a number of transceivers which are portable, hand-held devices similar to mobile telephones. However, instead of transceivers, there could be individual receivers and transmitters. The invention itself is embodied only in the receiving part of each apparatus, since it involves the correlation and accumulation of data from a received signal. Accordingly, the overall system and the transmitter are not illustrated in detail here, but they will be apparent from the system disclosed in our UK Patent GB2383709B referred to above, which is hereby incorporated in its entirety by reference.

A DSSS signal received by a receiver embodying the invention is transmitted by a transmitter which has a sequence generator storing the pseudo noise (PN) chip sequence. The digital sequence from the sequence generator is combined with a data stream, which may comprise voice data, and the composite signal then modulates a fixed frequency carrier signal from a local oscillator. This is then mixed with the output of a frequency hopped oscillator which is controlled to change frequency in 125 hops over a repeated cycle. The mixed signal is amplified and fed to an antenna. In the case of radio interference, one or more frequency bands may be barred, by appropriately controlling the frequencies available to the frequency hopped oscillator.

As described in GB2383709B, the receiver has an antenna and a receive amplifier, and mixes the input signal with the output of a frequency hopped oscillator under appropriate synchronisation control, so as effectively to remove the frequency hopping. The receiver stores the same algorithm for frequency hopping that is used in the transmitter, in order to demodulate the frequency hopping.

This partially-demodulated output is then fed to a receiver processor which synchronises with the phase of the DSSS in order to acquire the incoming signal and demodulate it. The receiver has a signal processing capability which stores the pseudo noise chip sequence that is used in the transmitter, and performs a correlation of the input signal with this sequence. This demodulation function corresponds to the operation of a standard GPS receiver, whose output provides the navigation solution, or range determination.

The bursts of signal that are transmitted one after the other at the different frequencies of the frequency hopping cycle produce an effective bandwidth which is much larger than the bandwidth of each burst and which may cover substantially all or part of the entire system bandwidth. By way of example, the overall centre frequency may be at 3 GHz, the bandwidth being 1.25 GHz, established by 125 hops changing the frequency by 10 MHz. The frequency hops may be linear or pseudo random, to suit the performance of the local oscillator.

A position fixing system may comprise a receiver receiving signals from four reference transmitters at known locations and which are time synchronised. The ultra-wideband signals help allow the receiver to detect smaller time differences than with other systems, reducing the position errors due to the multi-path nature of transmissions, in the event that there are obstacles and reflecting surfaces in the environment of the receiver and transmitters.

Figure 1:
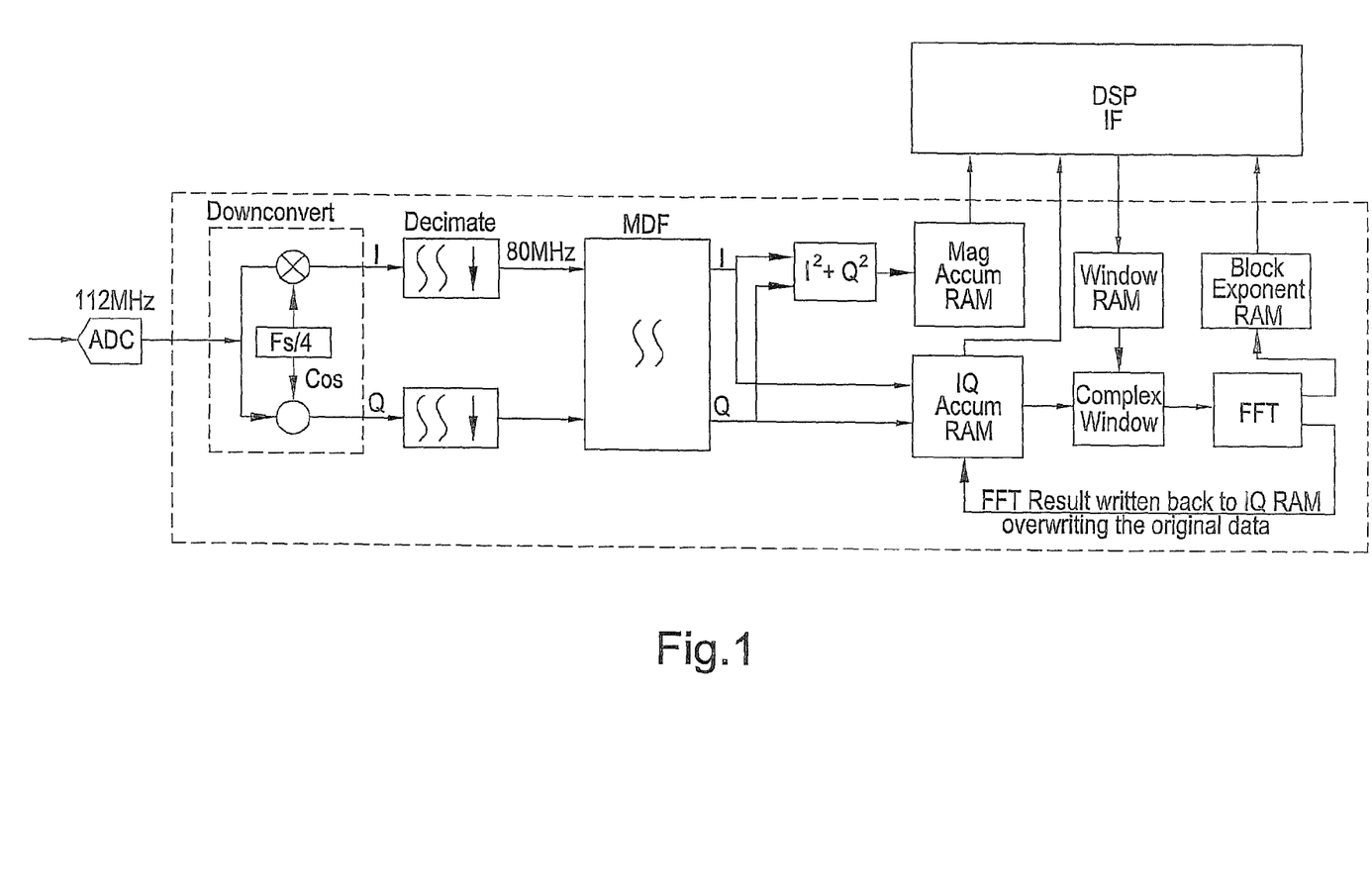
FIG. 1 is a block diagram of a receiver according to a first embodiment of the invention.
Figure 7:
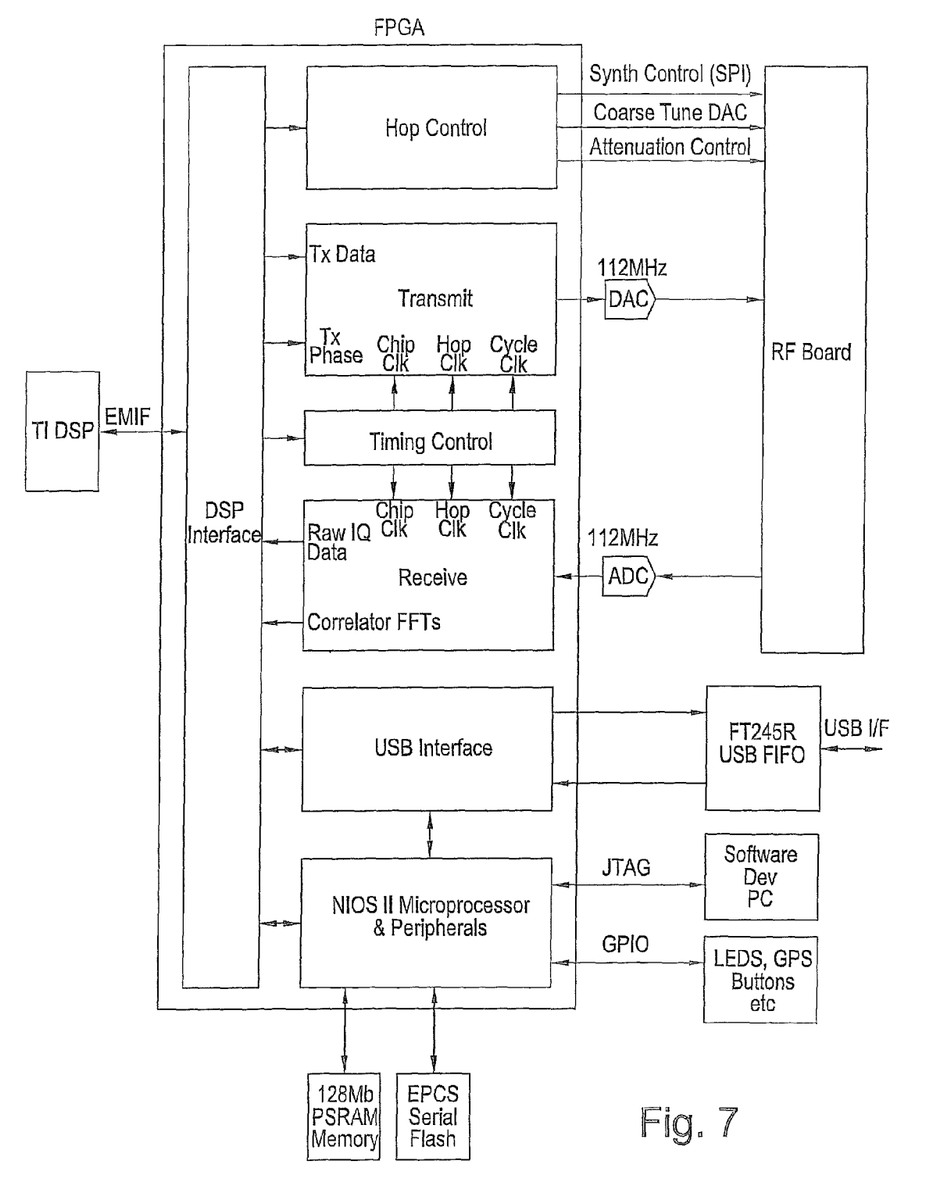
FIG. 7 is a main functional block of a receiver according to a second embodiment of the invention.

A receiver embodying the invention has base frequency, intermediate frequency and radio frequency sections, described more fully with reference to the second embodiment shown in FIG. 7. The main functional components of the receive block of a first embodiment of the invention are shown in FIG. 1. The receiver intermediate frequency, IF, is sampled at 112 MHz. As the received IF is centred at 140 MHz, for conversion to base band the processor block, which is an FPGA, field programmable gate array, removes the residual 28 MHz modulation. This is achieved by mixing the ADC signal with sin and cos waveforms at one quarter of the sampling frequency, i.e. 28 MHz. The down converter outputs I and Q 12 bit samples at a clock rate of 112 MHz, and these signals are decimated down to 80 MHz, to provide quarter chip resolution (the DSSS signal being at 20 MHz).

Figure 2:
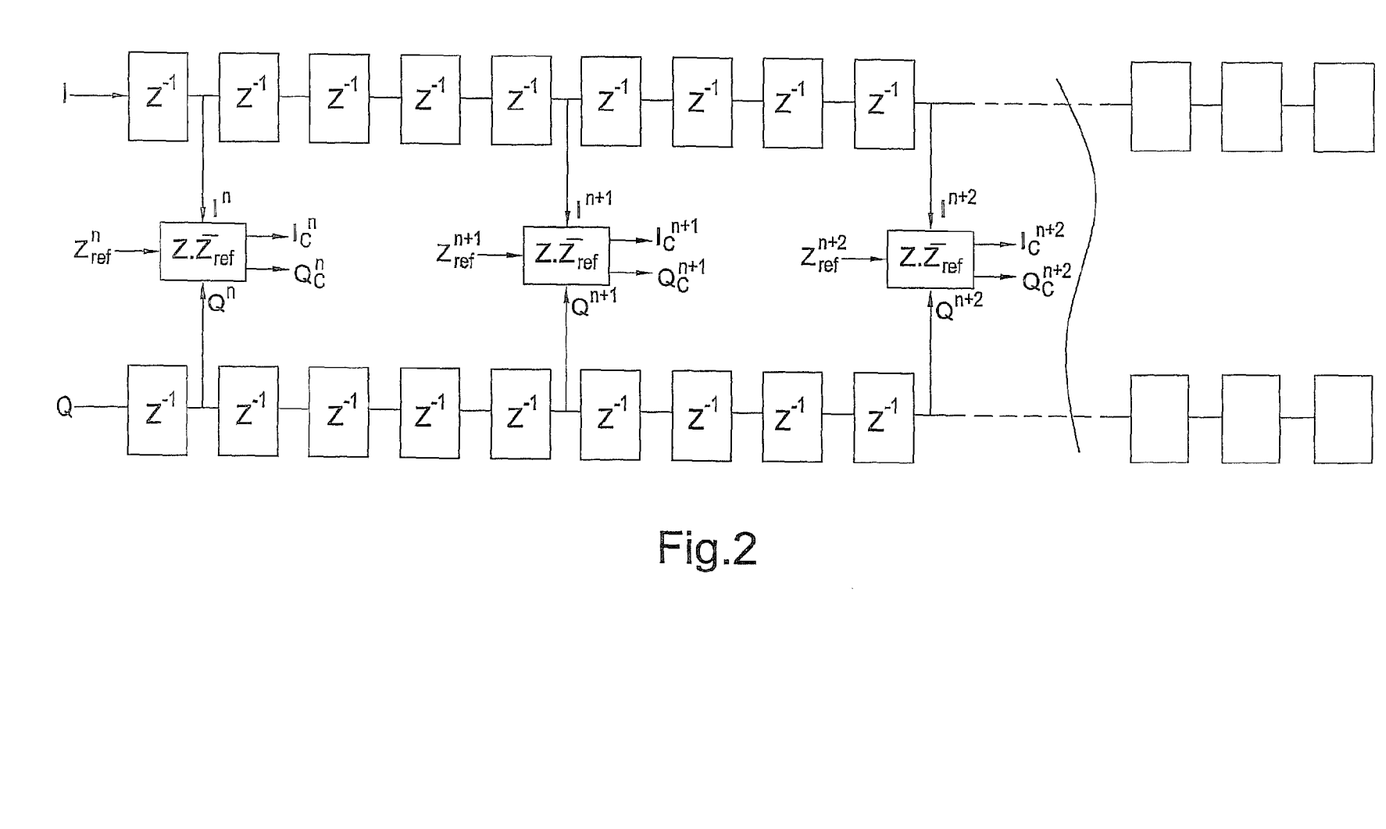
FIG. 2 represents a simplified matched data filter, MDF, of the receiver of FIG. 1.

In this embodiment, correlation with the stored pseudo noise sequence is performed by a matched data filter, MDF, shown in more detail in FIG. 2.

The pseudo noise sequence in this example is a 40 bit QPSK sequence which is repeated once, to provide an 80 bit sequence.

The filter consists of two 12 bit wide shift registers which are 160 words long. As shown in FIG. 2, the I samples are shifted into one shift register whilst the Q samples go into the other. Each pair of elements (I and Q) represents ¼ chip of the received signal (hence 4×40=160 taps). Every fourth tap of the paired shift registers is tapped off and fed into a complex multiplier which multiplies the tapped I and Q samples by the complex conjugate of the corresponding bit of the complex PN spreading sequence. The complex results of each multiplication then go into an adder tree which forms the sum of all the multiplication operations at the current ¼ bit position, which is the output of the filter.

When at the limit of the system's signal-to-noise ratio, SNR, capability the only way reliably to detect synchronisation with a received signal is via the FFT output which is described below. However, in higher SNR situations it is possible to detect chip synchronisation by accumulating the magnitude of the matched filter output over all 124 useful hops in a cycle. The optional magnitude accumulator, shown in FIG. 1, performs this task.

The IQ Accumulator of FIG. 1 is responsible for storing the I and Q matched filter outputs over the duration of a cycle. At the end of the cycle the data is read out by the FFT block which performs an FFT transform on the data and writes the results back to the IQ accumulator RAM (i.e. if the DSP needs to read the raw IQ data it must do so before the FFTs are run).

Unlike the Magnitude accumulator the only accumulation the IQ accumulator block does is over the repeated 40 bit sequence in each hop such that the value stored at the end of the hop is the cyclic sum of two sets of the 40 bit PN sequence. Ideally all 160 (after accumulation) matched filter outputs would be stored to RAM for each of the 125 hops (i.e. 160× 125×2=40 k words). It would be necessary to run 160 FFTs of 128 points each. This would effectively implement fully parallel correlation at ¼ bit resolution.

Whilst, using the largest Altera Cyclone II (Trade Mark) FPGA, it would be possible to do that described above, it would use a substantial amount of power in the operation of the RAM, which is significant in a battery-powered product; also it would leave little RAM left for expansion, and performing 160 FFTs within a cycle of 1 ms would require more complex FFT arrangements. Consequently a compromise solution which provides most of the advantages of fully parallel correlation but using about half the resources, is used, in accordance with the invention.

In the detailed scheme chosen, the IQ accumulator block stores a minimum of every fourth matched filter output (i.e. at 1 chip resolution), but over an area of 10 chips' duration it stores every matched filter output thus providing ¼ chip resolution over this focus area or higher resolution portion. The starting chip position for the focus area is programmable. Once the peak correlation value is found, the ¼ chip resolution focus window is placed over it to enable accurate leading edge determination at the FFT output. However, should the peak return unexpectedly move a large distance, it will still be detectable, only at the lower 1 chip resolution. The concept is illustrated in FIG. 3.

Figure 4:
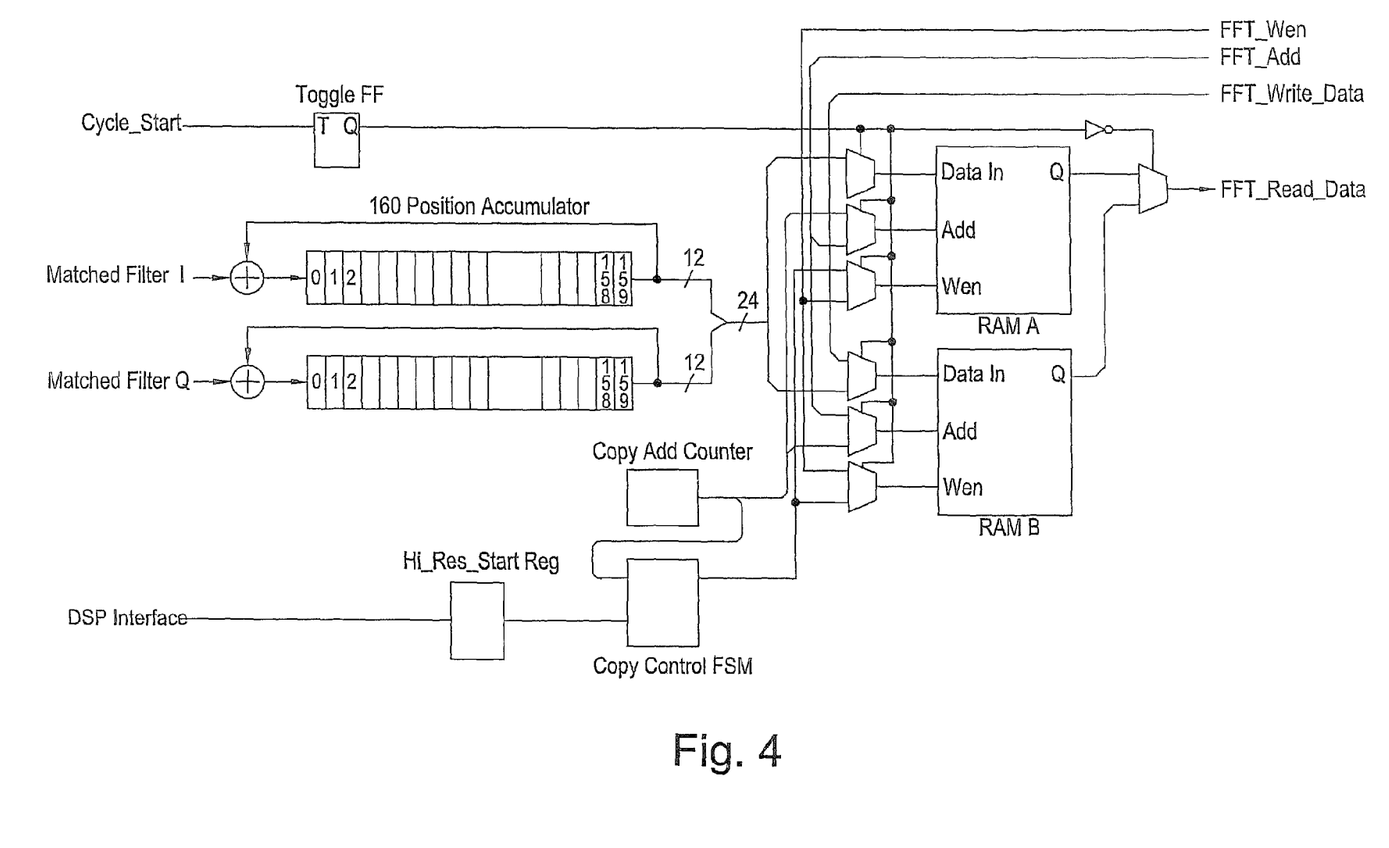
FIG. 4 is a block diagram of a simplified IQ accumulator of the receiver of FIG. 1.

A moderately simplified representation of the IQ Accumulator is shown in FIG. 4. The block contains two 160 position accumulators which are used to accumulate the 2 cyclic forty bit chip outputs of the matched data filter to form a total energy for the hop. At the end of the PN sequence part of the hop (i.e. during the tail symbols) the contents of the I and Q accumulator RAMs are copied to one of two larger RAM blocks A, B. The RAM blocks are arranged so as to form a double buffer arrangement with them swapping roles at each cycle boundary. In any cycle, one RAM will have the new IQ data received during that cycle written into it whilst the other RAM, which will contain the previous cycle's data, will be being read and written by the FFT block.

During the copy process, in the low-resolution region every fourth accumulator value is copied into the RAM, whilst in the high-resolution region all the accumulator values are copied. In total there will be 30 results copied across at 1 chip spacing and 40 at ¼ chip spacing, making 70 samples to be stored in each hop, as shown in FIG. 3 and described below with reference to FIG. 5.

There are a further two samples stored per hop, making 72. These are first and second half values of a single selected ¼ chip position, i.e. rather than accumulating the two forty chip PN sequences, the filter output at a DSP selected sample position for the first half of the hop is stored in one register and that for the second half in another register, these then being copied to RAM at the end of the hop. These two half values allow the DSP to check for a 40 chip synchronisation offset.

Also, but not shown in FIG. 4, is the capability of the DSP to read directly the contents of the IQ RAM blocks.

Each hop in this example has 80 words of RAM reserved for its use, though only 72 words are used. The data from the cyclic accumulators (I and Q) is written to the RAM in the order illustrated in FIG. 5.

Figure 5:
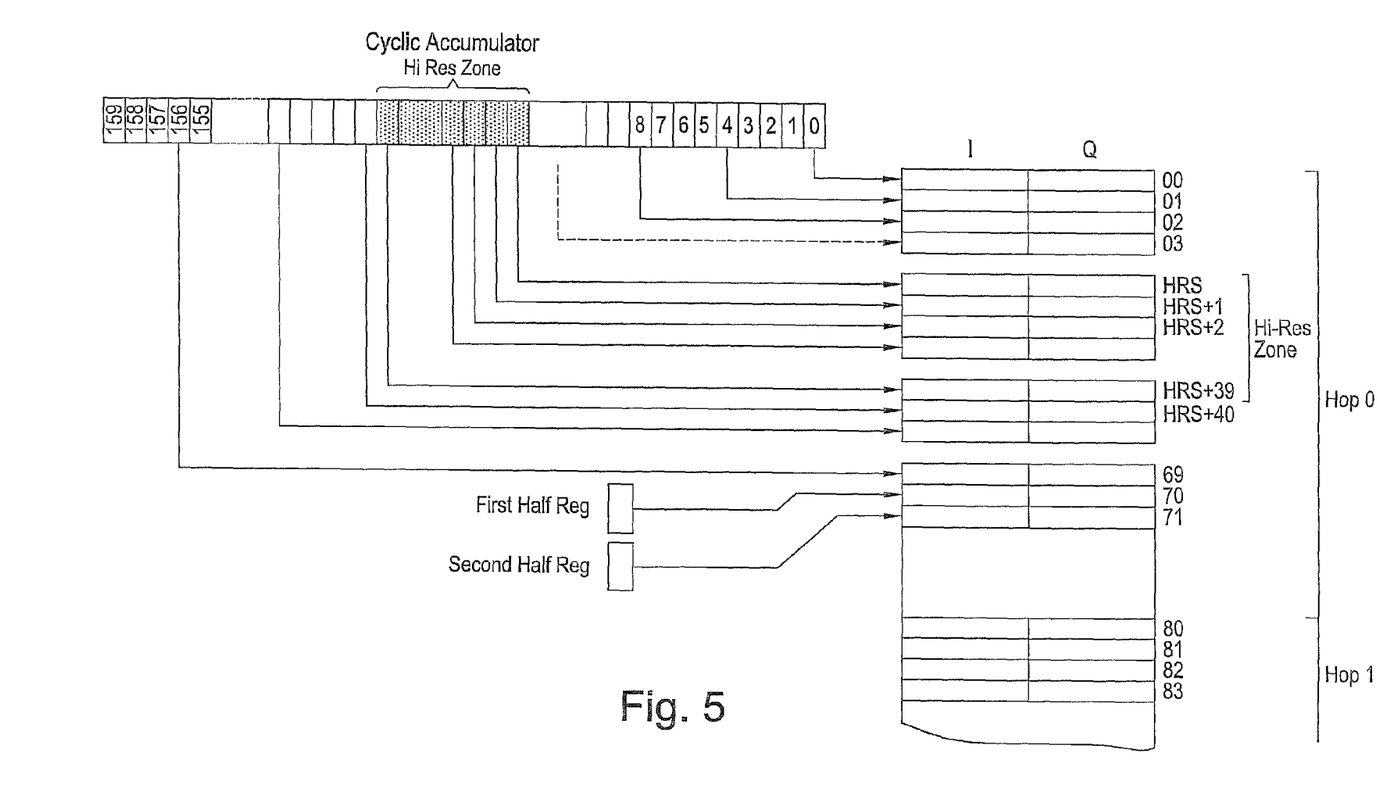
FIG. 5 represents the format of an IQ RAM, random access memory, of the receiver of FIG. 1.

The I and Q accumulator data are truncated to 12 bits each and formed into a 24 bit word before being written to the RAM.

If RAM were to become particularly short in a modification, the cyclic accumulator could be removed and the matched filter outputs directly accumulated in-situ in the block RAM.

Figure 6:
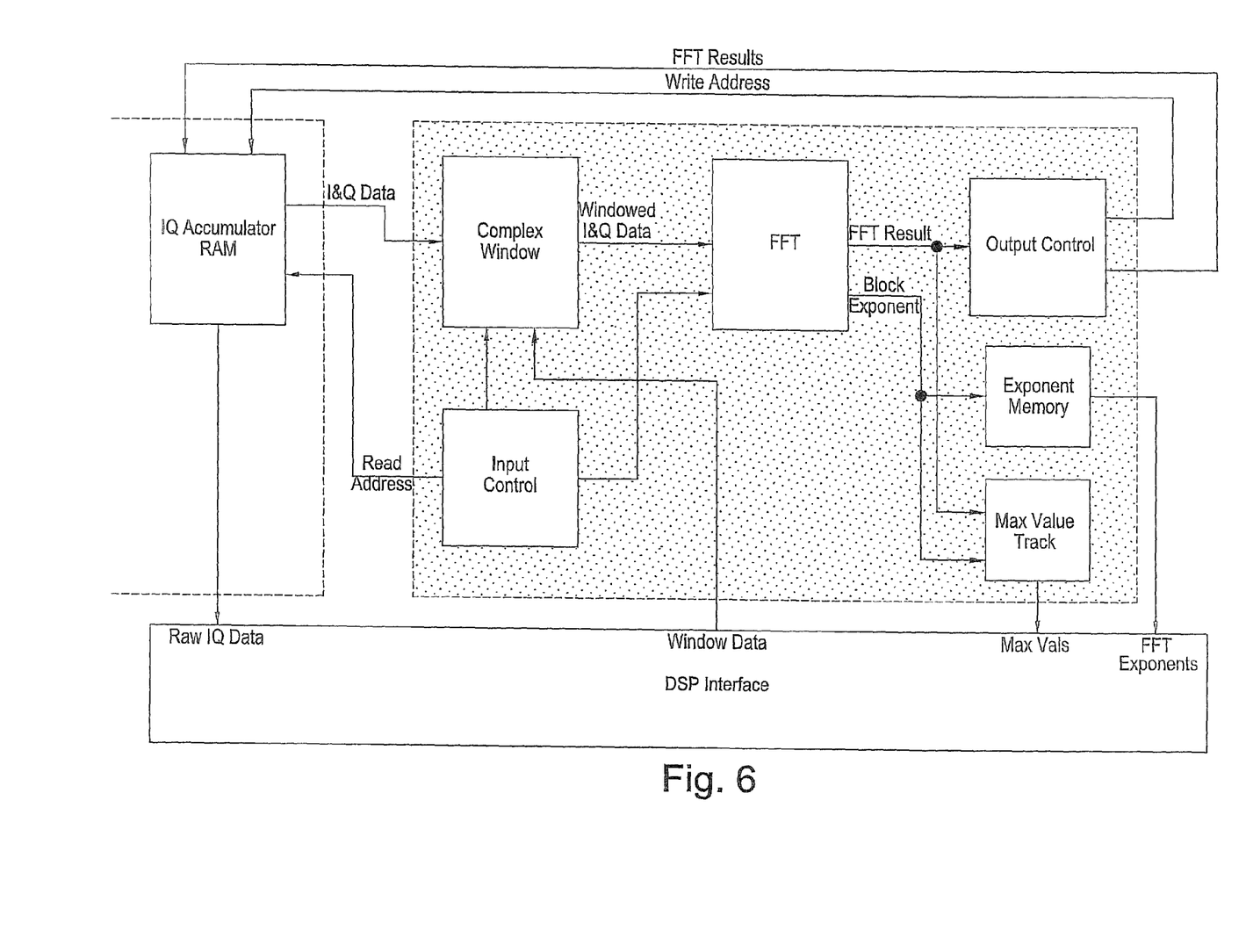
FIG. 6 is a block diagram of the FFT, Fast Fourier Transform, block of the receiver of FIG. 1.

The FFT block of FIG. 1 is shown in greater functional detail in FIG. 6, and it contains the control logic required automatically to read out I and Q hop data from the IQ RAM and to feed this, via a complex windowing function, into an FFT IP block. The results of the FFT are then written back into the IQ RAM.

As described above, the IQ accumulator stores 72 sets of I and Q data for each of the 125 hops. The FFT block takes one sample from the same bit position in each hop and forms this into 125 samples for input to the FFT. The samples are zero padded to make them up to 128. These are then fed through a complex windowing function. The window data is directly programmable by the DSP, and can thus be used to implement excision of jammed carriers etc. that are to be barred, as described above.

The windowed data is then fed into a 128 point FFT block. This produces 128 complex outputs plus a block exponent (i.e. the exponent applies to all 128 results). The FFT results are stored back into the IQ accumulator RAM in the locations previously occupied by the input data. The exponent is stored in a separate Exponent memory (as there is only one exponent per FFT the exponent memory is small).

Whilst the FFT block is streaming its result data out, the Max Values tracking block tracks the maximum of the magnitude output ($I^2+Q^2$) and records the maximum in a Max Value memory (one per FFT). This sub-block also keeps track of which FFT has the overall maximum value and stores both the maximum value and the FFT number to which it belongs.

The process described above is repeated 72 times (i.e. for each of the 72 sets of IQ data in each hop).

At the end of the process, the DSP generally just reads the list of maximum FFT values and then will read the FFT results from up to 24 of the FFTs around the peak return. However, if it needs to check any other FFT results in detail, the data is there for it to read.

A second embodiment of the invention will now be described with reference to FIGS. 7 to 11.

As shown in FIG. 7, the architecture of receiver contains a DSP interface block which allows a Texas Instruments (Trade Mark) DSP device to communicate with the FPGA via its EMIF bus.

A USB interface block allows the DSP to write to and read from a Future Technologies FT245R (Trade Mark) USB interface chip which provides a very simple to use USB interface to the FH-UWB (Frequency Hopped UWB) system.

The Hop Control block allows the DSP to preload all the hop settings required for a complete transmission or reception cycle, such as Stepped synthesiser frequency and coarse tuning voltage. The FPGA will then automatically output the appropriate data at the start of each hop of the cycle. This frees up the DSP from the task of writing this data at the hop rate.

The Timing Control block provides chip, hop and cycle timing information to both the Transmit and Receive blocks and is programmable via the DSP to allow hop timing to be advanced or retarded as required to attain synchronisation.

The Transmit block is responsible for producing the DSSS signal at the IF frequency. The block allows the transmission of 'pilot' cycles which are devoid of any modulation other than the PN sequence used to generate the spread spectrum. It can also produce QPSK data modulated cycles. In order to provide the range response half of a ping-pong ranging transaction, the block allows the phase of the transmitted signal to be controlled, as well as the PN sequence chip timing controlled by the Timing Control. This allows the range response to appear as an accurate mirror of the received range request, without requiring the main VTCXO to be pulled for each ping-pong range response.

The Receiver block implements down conversion of the sampled IF to base band, sample rate change from 112 MHz to 80 MHz, de-spreading of the signal and correlation of the signal at multiple chip timings using up to 140 FFTs per cycle.

Figure 8:
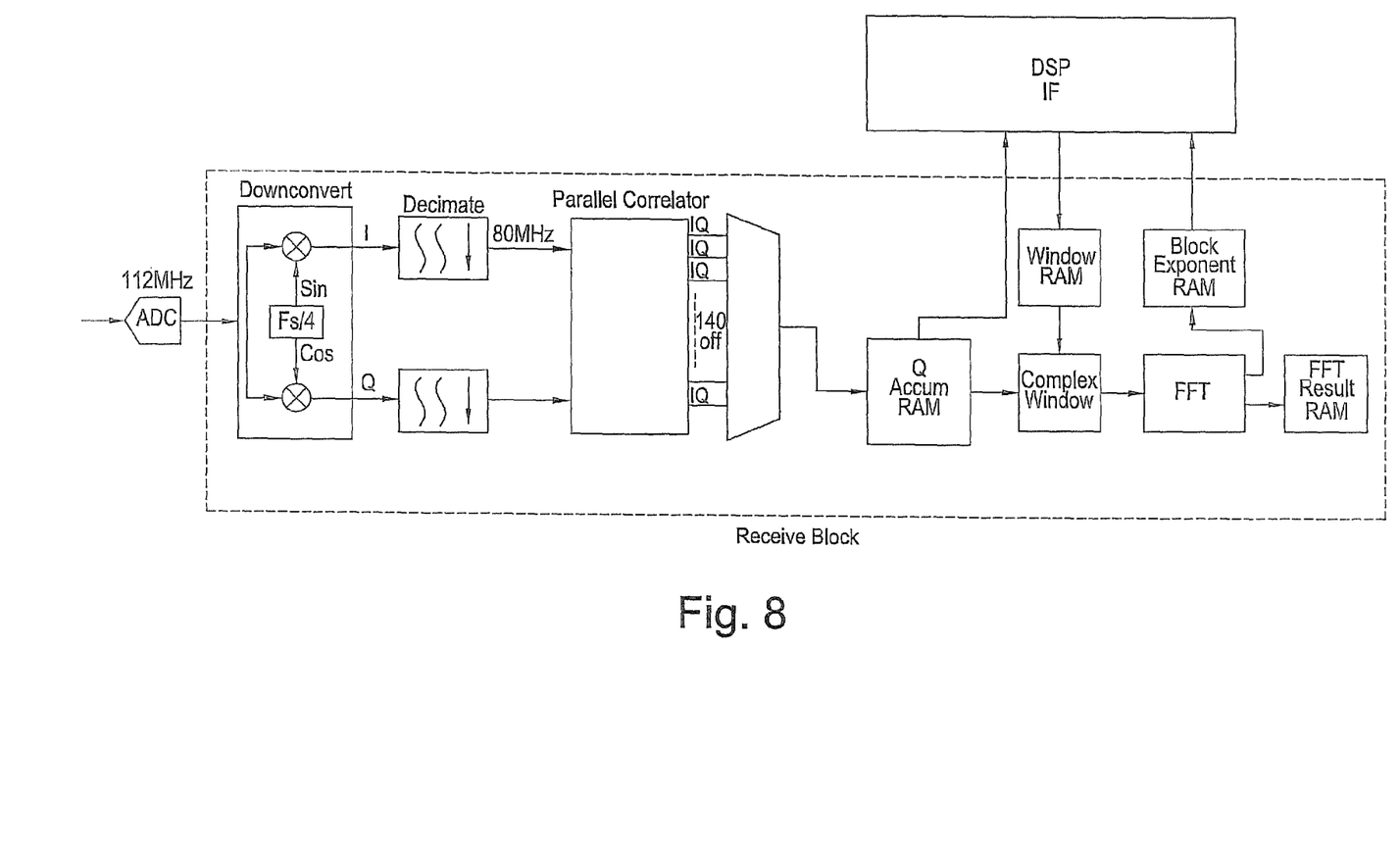
FIG. 8 is a simplified block diagram of the receive block of FIG. 7.

A simplified functional block diagram of the Receive block of FIG. 7 is shown in FIG. 8.

As with the first embodiment, the receiver IF is sampled at 112 MHz.

Conversion to signals at 80 MHz is performed as described above in relation to FIG. 1.

In the first embodiment, a matched filter arrangement is used to correlate on the repeated 40 chip sequence. However, using a matched filter does make it quite difficult to get the results the software expects at large timing offsets, such as are experienced during acquisition searches. In the second embodiment, the correlation is performed using 140 parallel correlators. In a variant of the first embodiment, the 40 chip repeated sequence is changed to a different 80 chip sequence; thus the MDF would have to be 320 taps long. A simplified diagram of the parallel correlator is shown in FIG. 9.

The parallel correlator implements the concept of the focus or high-resolution region of the invention, although in this case the position of the focus region is hard-coded into the FPGA.

Figure 9:
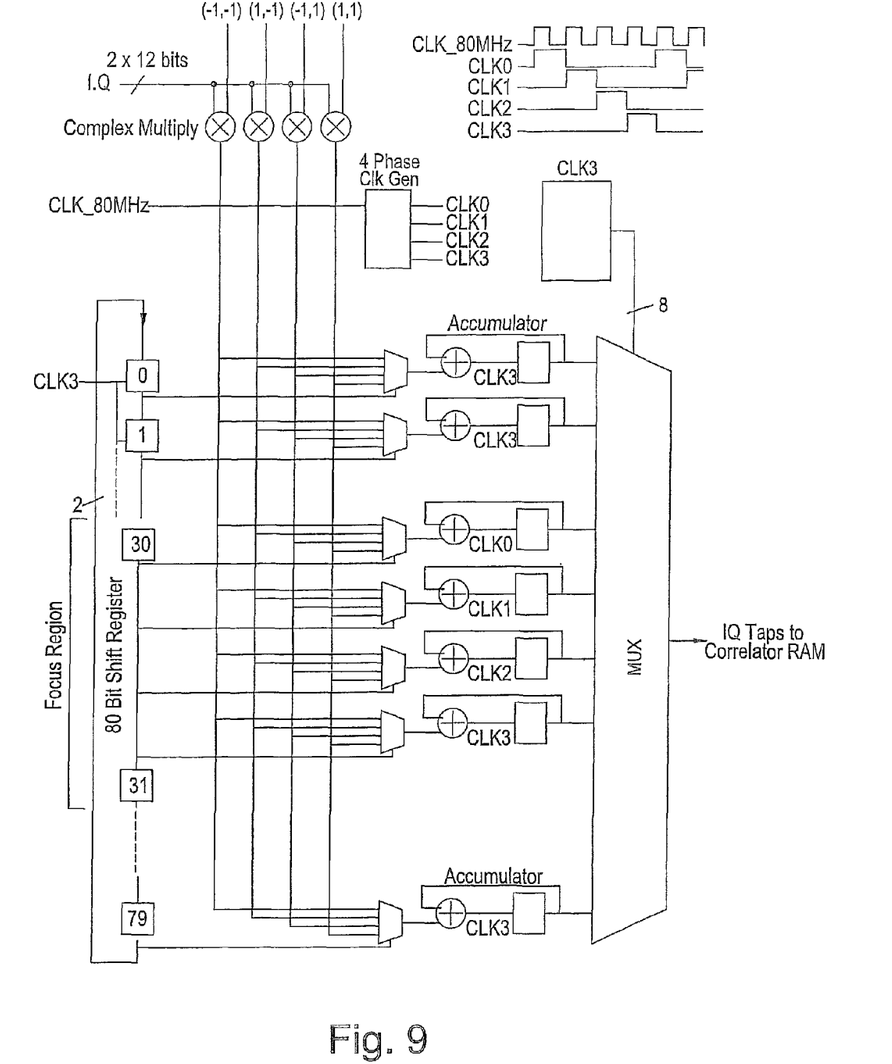
FIG. 9 is a simplified block diagram of the parallel correlator of the receive block of FIG. 8.

As shown in FIG. 9, the correlator contains an 80 tap, 2 bit shift register which circulates the reference PN sequence during the PN_RUN period. At the peripheries of the correlator, one accumulator is attached to every tap of this shift register, whilst in the central focus region four accumulators are attached to every tap and are clocked on separate phases of the four phase clock, thus providing ¼ chip resolution in the focus region and 1 chip resolution elsewhere.

As the PN sequence has only four possible states, as I and Q are either −1 or 1, the four possible results of multiplying the incoming ADC data by these codes are calculated just once. Each accumulator then simply uses the PN code presented to it by its tap of the shift register, to select one of the four pre-calculated values to add to its accumulated result. Again, the accumulators only accumulate whilst PN_RUN is asserted (not shown).

At the end of the PN_RUN period a very large multiplexer MUX serialises the 140 accumulator outputs so that they can be written into the Correlator RAM block for subsequent FFT processing at the end of the cycle.

The IQ accumulator of FIG. 8 is responsible for storing the I and Q correlator outputs over the duration of a cycle. At the end of the cycle, the data is read out by the FFT block which performs an FFT transform on the data.

Each hop has 142 words of RAM reserved for its use (140 full correlator outputs plus the 2 half correlator outputs). The data from the correlators (I and Q) is written to the RAM in the order illustrated in FIG. 10.

Figure 10:
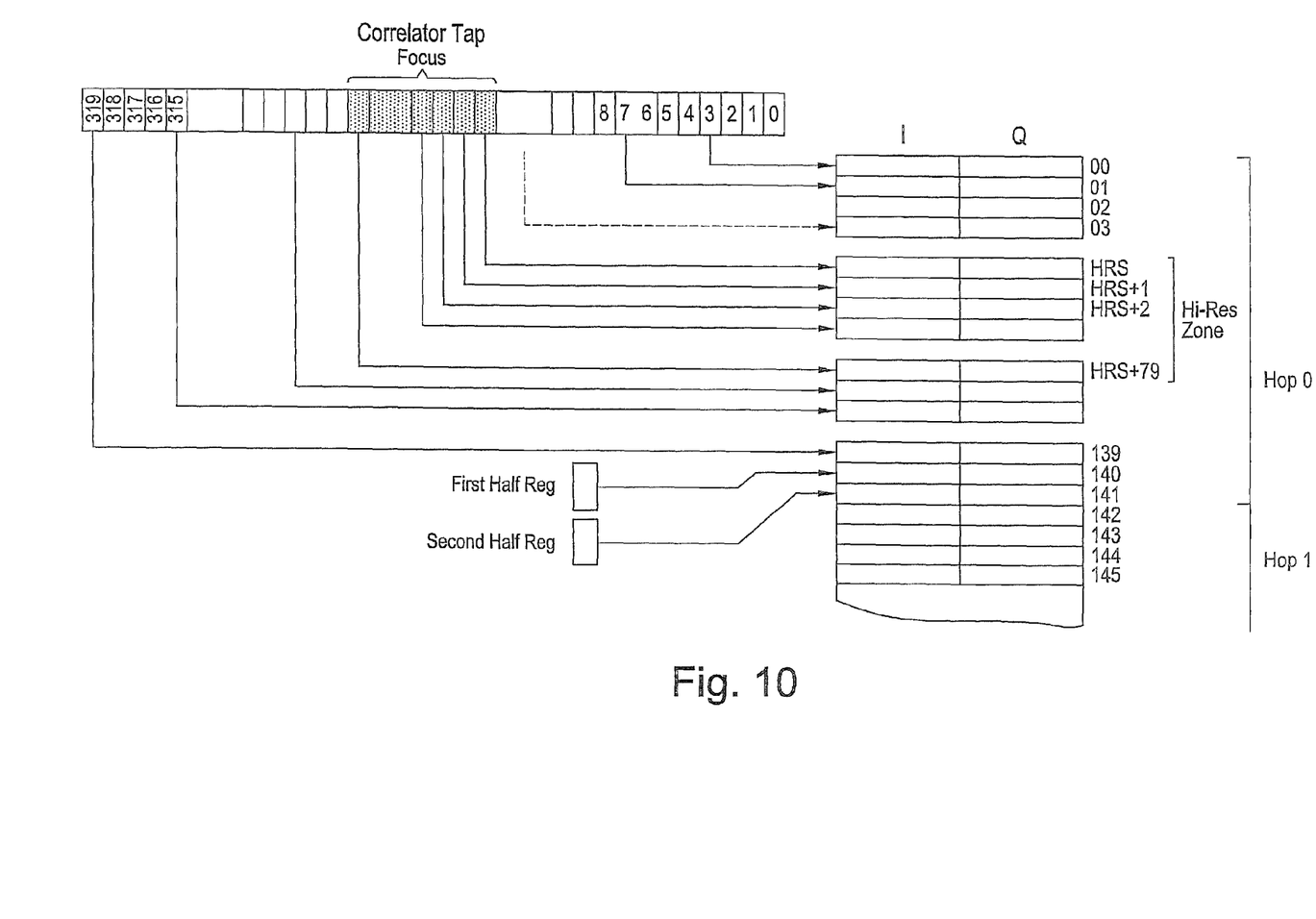
FIG. 10 represents the IQ accumulator RAM of the receive block of FIG. 8.

The I and Q accumulator data are truncated to 12 bits each and formed into a 24 bit word before being written to the RAM.

Figure 11:
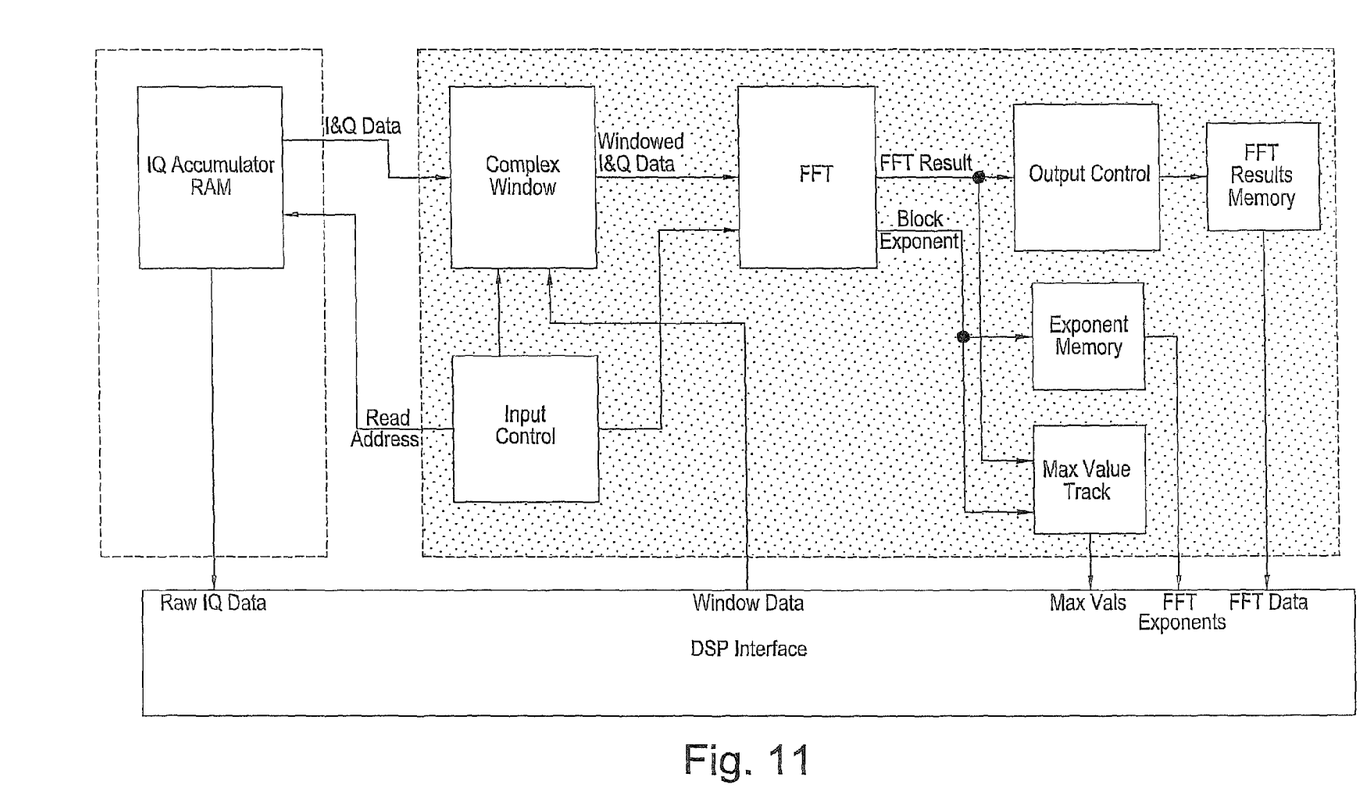
FIG. 11 represents the FFT block of the receive block of FIG. 8.

The FFT block of FIG. 8 contains the control logic required automatically to read out I and Q hop data from the IQ RAM and feed this, via a complex windowing function, into an FFT IP block. The results of the FFT are then written back into a FFT Results Memory mentioned below. A block diagram of the main FFT block functionality is shown in FIG. 11, and only the differences from that of the first embodiment, shown in FIG. 6, will be described below.

The IQ Accumulator RAM of FIG. 8 stores 142 sets of I and Q data for each of the 125 hops.

The FFT process described above in connection with FIG. 6 is repeated 140 times (i.e. for each of the 140 sets of IQ data in each hop). This is called the PEAK_SEARCH scan as no results are stored at this point, the system simply looking for the peak magnitude FFT. Once the PEAK_SEARCH scan has been completed up to 24 FFTs are repeated—choosing the IQ taps around the ones that resulted in the peak FFT. This time the full results are stored in the FFT Results Memory for later read out by the DSP.

The hop control block of FIG. 7 is responsible for programming a stepped synthesiser in the RF board, programming a coarse tune voltage, and setting the stepped synthesiser and IF attenuation values at the start of each frequency hop.

The invention claimed is:

1. A radio receiver arranged to sample an input signal comprising a carrier signal modulated by a predetermined spreading sequence of pseudo-noise code symbols or chips that is stored in the receiver, the carrier signal frequency hopping between predetermined values in a predetermined sequence which is repeated cyclically and is stored in the receiver; the receiver being arranged to accumulate, over all the hops of the frequency hopping cycle, digital samples of the input signal correlated with the spreading sequence, and to perform a Fourier transformation of the accumulated digital samples to generate output data representative of data conveyed by the input signal or the time of receipt of the input signal; the receiver comprising a processor arranged to synchronize itself with the frequency hopping cycle and with the spreading sequence at each predetermined value of frequency, by repeating the correlation at different phases of the hopping sequence and of the spreading sequence so as to maximize the output data; wherein the correlation and accumulation are performed at a higher sampling rate over a high-resolution portion of one spreading sequence cycle than over the remainder of that spreading sequence cycle.

2. A receiver according to claim 1, in which the sampling rate over the high-resolution portion is an integer multiple of the chip rate of the spreading sequence.

3. A receiver according to claim 2, in which the integer multiple is four.

4. A receiver according to claim 2, in which the sampling rate outside the high-resolution portion is equal to the chip rate.

5. A receiver according to claim 1, comprising multiple parallel correlators coupled to respective taps of a shift register which stores the spreading sequence.

6. A receiver according to claim 1, comprising a matched data filter having shift registers for storing the samples and multipliers for multiplying the shift register outputs with the spreading sequence, and an accumulator for storing the multiplication results for a cycle of the spreading sequence.

7. A receiver according to claim 1, in which the frequency hopping cycle is such that the frequency increases step-wise in a ramp in one cycle.

8. A receiver according to claim 1, in which the carrier frequency has an average over the frequency hopping cycle of between 1 GHz and 10 GHz.

9. A receiver according to claim 1, in which the spreading sequence chip rate is in the range of 1 MHz to 100 MHz.

10. A receiver according to claim 9, in which the spreading sequence chip rate is in the range of 10 MHz to 30 MHz.

11. A receiver according to claim 1, comprising a signal processor arranged to first synchronize the receiver with the input signal such that the accumulator stores the data from the demodulation of the input signal, and then to provide an output indicative of the timing of the leading edge of the impulse response of the channel on which the receiver receives the input signal, for use in position finding by determining the duration of transmission of the signal.

12. A receiver according to claim 1, comprising a signal processor arranged to first synchronize the receiver with the input signal such that the accumulator stores the data from the demodulation of the input signal, and then to provide an output signal representative of the data conveyed by the input signal.

13. A receiver according to claim 12, in which the data are low data rate communications data.

14. A transceiver comprising:
a transmitter of DSSS signals; and
a receiver arranged to sample an input signal comprising a carrier signal modulated by a predetermined spreading sequence of pseudo-noise code symbols or chips that is stored in the receiver, the carrier signal frequency hopping between predetermined values in a predetermined sequence which is repeated cyclically and is stored in the receiver; the receiver being arranged to accumulate, over all the hops of the frequency hopping cycle, digital samples of the input signal correlated with the spreading sequence, and to perform a Fourier transformation of the accumulated digital samples to generate output data representative of data conveyed by the input signal or the time of receipt of the input signal; the receiver comprising a processor arranged to synchronize itself with the frequency hopping cycle and with the spreading sequence at each predetermined value of frequency, by repeating the correlation at different phases of the hopping sequence and of the spreading sequence so as to maximize the output data; wherein the correlation and accumulation are performed at a higher sampling rate over a high-resolution portion of one spreading sequence cycle than over the remainder of that spreading sequence cycle,
wherein the transmitter and receiver share the same spreading sequence and frequency hopping cycle.

15. A positioning system comprising:
a transmitter of DSSS signals; and
a receiver arranged to sample an input signal comprising a carrier signal modulated by a predetermined spreading sequence of pseudo-noise code symbols or chips that is stored in the receiver, the carrier signal frequency hopping between predetermined values in a predetermined sequence which is repeated cyclically and is stored in the receiver; the receiver being arranged to accumulate, over all the hops of the frequency hopping cycle, digital samples of the input signal correlated with the spreading sequence, and to perform a Fourier transformation of the accumulated digital samples to generate output data representative of data conveyed by the input signal or the time of receipt of the input signal; the receiver comprising a processor arranged to synchronize itself with the frequency hopping cycle and with the spreading sequence at each predetermined value of frequency, by repeating the correlation at different phases of the hopping sequence and of the spreading sequence so as to maximize the output data; wherein the correlation and accumulation are performed at a higher sampling rate over a high-resolution portion of one spreading sequence cycle than over the remainder of that spreading sequence cycle, wherein the positioning system is arranged to determine the separation of the transmitter from the receiver as a function of the difference between the times of transmission and reception of a DSSS signal.

16. A positioning system according to claim 15, in which the transmitter and receiver are each part of a cellular telephone network.

17. A method of receiving an input signal comprising a carrier signal modulated by a predetermined spreading sequence of pseudo-noise code symbols or chips, the carrier signal frequency hopping between predetermined values in a predetermined sequence which is repeated cyclically, the method comprising accumulating, over all the hops of the frequency hopping cycle, digital samples of the input signal correlated with the spreading sequence, performing a Fourier transformation of the accumulated digital samples to generate output data representative of data conveyed by the input signal; and establishing the timing of the frequency hopping sequence and of the spreading sequence at each hop in order to obtain synchronization, by maximizing the output data from the Fourier transformation; wherein the correlation and accumulation is performed at a higher sampling rate over a high-resolution portion of one spreading sequence cycle than over the remainder of that spreading sequence cycle.

* * * * *